United States Patent
Zhang et al.

(10) Patent No.: US 8,758,616 B2
(45) Date of Patent: Jun. 24, 2014

(54) ZERO-VALENT IRON TWO-PHASE ANAEROBIC REACTOR

(75) Inventors: Yaobin Zhang, Liaoning (CN); Yiwen Liu, Liaoning (CN); Xie Quan, Liaoning (CN); Xusheng Meng, Liaoning (CN); Shuo Chen, Liaoning (CN); Zhiqiang Zhao, Liaoning (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 13/981,884

(22) PCT Filed: Sep. 21, 2011

(86) PCT No.: PCT/CN2011/079911
§ 371 (c)(1),
(2), (4) Date: Jul. 25, 2013

(87) PCT Pub. No.: WO2012/100550
PCT Pub. Date: Aug. 2, 2012

(65) Prior Publication Data
US 2013/0313172 A1 Nov. 28, 2013

(30) Foreign Application Priority Data
Jan. 25, 2011 (CN) .......................... 2011 1 0026693

(51) Int. Cl.
*C02F 3/00* (2006.01)

(52) U.S. Cl.
USPC ....................................................... 210/603

(58) Field of Classification Search
USPC ....................................................... 210/603
See application file for complete search history.

(56) References Cited

U.S. PATENT DOCUMENTS

2004/0133059 A1   7/2004  Scalzi et al.
2009/0032458 A1*  2/2009  Jensen et al. .................. 210/603

FOREIGN PATENT DOCUMENTS

| CN | 1583599 A | 2/2005 |
| CN | 1785839 A | 6/2006 |
| CN | 101054226 A | 10/2007 |
| CN | 101302053 A | 11/2008 |
| CN | 101591064 A | 12/2009 |
| CN | 102120675 A | 7/2011 |
| WO | WO-2009/042228 A1 | 4/2009 |

OTHER PUBLICATIONS

Huangshao Bin et al., "The effect of monosodium glutamate wastewater biochemistry treatment with addition of iron salt," Journal of South China University of Technology (Natural Science Edition), 29(3), Mar. 31, 2001, pp. 103-106.

\* cited by examiner

*Primary Examiner* — Chester Barry

(74) *Attorney, Agent, or Firm* — Muncy, Geissler, Olds & Lowe, P.C.

(57) ABSTRACT

The invention, belongs to the field of wastewater treatment technology, is a two-phase anaerobic reactor enhanced by addition of zero valent iron (ZVI). In the reactor, 2~4 ZVI-filling layers are settled in the middle of the anaerobic hydrolysis-acidification tank, the effluent of which is fed into the rear anaerobic methanogenic tank. The degradation of organics is effectively enhanced in the anaerobic hydrolysis-acidification tank with dosing of ZVI, which may produce more acetic acid that is a desired substrate for the subsequent methanogenesis. Meanwhile, the acidic environment of the hydrolysis-acidification tank is helpful for the dissolution of ZVI to maintain its activity. The reactor is reasonably designed with high performance and strong shock resistance in anaerobic treatment of various wastewaters. Tests in lab-scale showed that hydrolysis-acidification and methanogenesis in this combined system were significantly improved compared with a reference reactor without addition of ZVI.

2 Claims, 3 Drawing Sheets

ZERO-VALENT IRON TWO-PHASE ANAEROBIC REACTOR

TECHNICAL FIELDS

Figure 1:
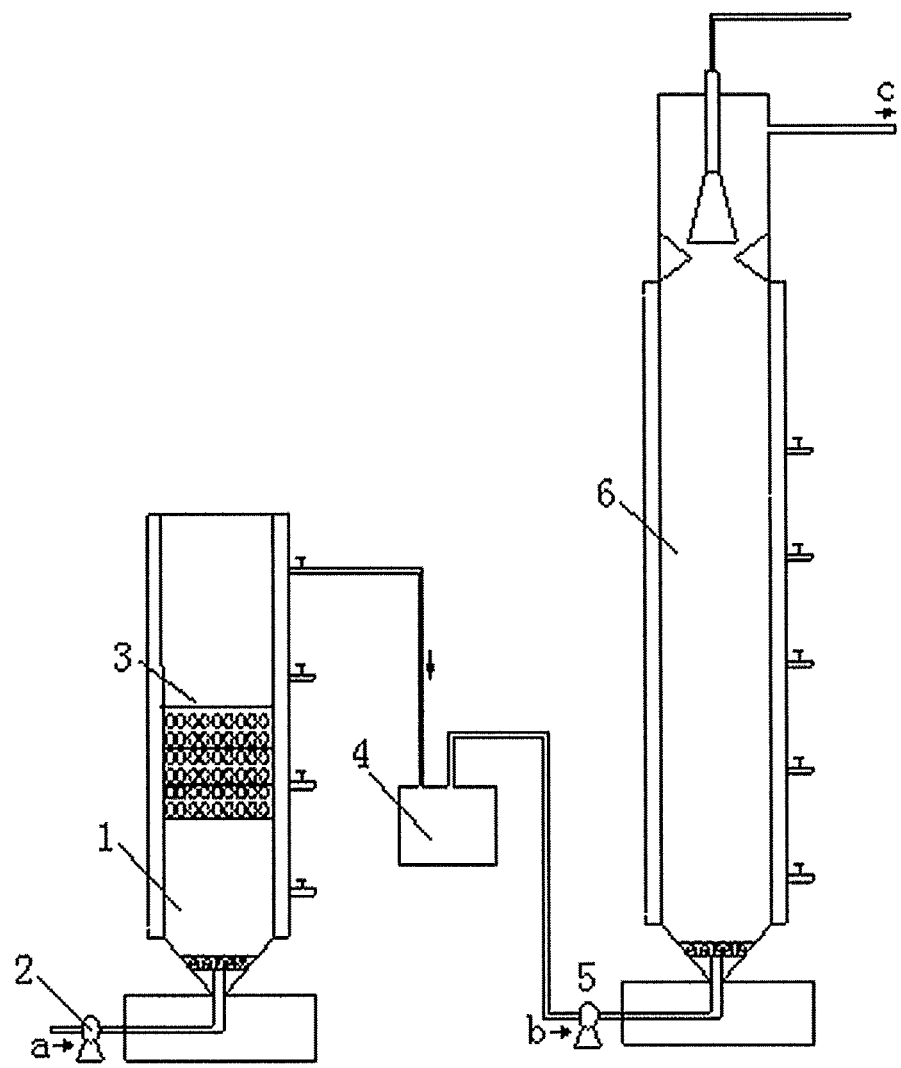

The invention belongs to the field of wastewater treatment technology, relating a two-phase anaerobic reactor enhanced by addition of zero valent iron (ZVI).

BACKGROUND ART

Most of chemical, pharmaceutical and coking industries discharge high-strength organic wastewaters with low biodegradability. These effluents are difficult to treat because of containing toxic substances and its high chemical stability. It poses a great risk to the environment and human health once these effluents enter into water body.

Anaerobic wastewater treatment process has obvious advantages in treatment of high-strength organic wastewater due to its high volume load, low energy consumption and even generating energy gas (i.e., $CH_4$). The volume load of anaerobic process can reach several to dozens kilograms of $COD/m^3$ d, which is generally more than ten times of aerobic process. Therefore, anaerobic technology is considered as a suitable method to treat high concentration of organic wastewater.

However, anaerobic process is susceptible to the operational conditions, such as pH, oxidation-reduction potential (ORP) and temperature. Especially, maintaining a neutral pH value is crucial for anaerobic methanogenesis, but pH balance between acidification and methanogenesis is easily destroyed because acidification generates acidity fast while methanogenesis consumes acidity slowly. As a result, the anaerobic performance will decrease when the anaerobic reactor presents acidity.

In order to improve the stability of anaerobic wastewater treatment, it is necessary to create a favorable pH condition for methanogenesis. So far, adding alkaline in the inlet or the anaerobic reactor is frequently used to control acidic pH. However it not only increases the complexity of the operation, but also makes the alkaline concentration in the dosing point much higher than other parts, which may cause serious damage (alkalinity, salinity, anion, etc.) to the anaerobic system.

As a cheap and environmentally friendly reductant, zero-valent iron (ZVI) has received much attention in the field of pollution control in recent years. It was reported that in the anoxic groundwater, ZVI could not only directly decompose organic chlorine as electron donor, but also promote the metabolism of methane-producing bacteria and then speed up the mineralization of organic chlorine. Permeability activity grille (PRB), based on this principle, has been applied in the groundwater treatment and soil remediation. In wastewater treatment, ZVI is mainly used in the preprocessing to improve the biodegradability prior to biotreatment. In our patent application CN200910012293.4, ZVI is put in a single anaerobic reactor, in which releasing ferrous ion compressed the electric double layer to reduce the Zeta potential. As a result, the methanogenesis was enhanced and the anaerobic sludge granulation was accelerated. In addition, ZVI could reduce the ORP in the anaerobic reactor to create a more reductive environment for the growth of methanogenesis.

Technical Problems

The two-phase anaerobic treatment process is a basic method to enhance anaerobic performance, in which the hydrolysis-acidification and methanogenesis are separated into the two single reactors to occur. The pH of the effluent from the hydrolysis-acidification may be adopted and then is fed to methanogenesis. However, regardless of optimizing hydrolysis-acidification, the feeding for methanogenesis is lack of the favorable substrates, which often leads to the low treating efficiency.

It is well known that methanogens can utilize only a limited number of substrates. The substrates are restricted to three major types: acetate, methyl-group containing compounds and $CO_2$. Other acidogenic products such as propionate cannot be utilized for methanogenesis until being degraded into acetate. The degradation of propionate is thermodynamically unfavorable. Therefore, accumulation of propionate is often observed in anaerobic reactor malfunctions, which will destroy the pH balance between acidogenesis and methanogenesis. Therefore, the production of propionate or propionic-type fermentation should be reduced during the acidogenesis stage.

Obviously, ZVI was added into a single anaerobic reactor as our previous patent (CN200910012293.4) could not simultaneously optimize the hydrolysis-acidification and create suitable condition for methanogenesis. Also, because the water flow rate in the anaerobic methanogenic reactor is quite low due to long hydraulic retention time required, microorganisms are easily attached on ZVI surface to decrease the activity of ZVI.

Solutions

In order to address the problems above, we put forward a novel strategy for enhancing anaerobic performance. A two-phase anaerobic reactor enhanced by ZVI, in which hydrolysis-acidification can be optimized and accelerated in the presence of ZVI and methanogenesis is enhanced due to favorable organic acid forms provided. Different from the existing two-phase anaerobic process or our previous patent (CN200910012293.4), we here add ZVI in the hydrolysis acidification tank to accelerate anaerobic hydrolysis of organics to promote the formation of acetate, which is the favorable substrate for the subsequent methanogens. Furthermore, due to the ZVI's reductibility, ZVI may enhance acetic-type fermentation to increase acetate production directly from carbohydrate and decrease propionic-type fermentation to reduce propionate production directly from carbohydrate. The reason is because acetic-type fermentation is an obligate anaerobic process happening at a relatively low ORP value, while propionic-type fermentation is a facultative anaerobic process happening at a relatively high ORP value.

A two-phase anaerobic reactor enhanced by zero-valent iron (ZVI) mainly consists of an anaerobic hydrolysis-acidification tank (1) equipped with ZVI filling layer (3), and an anaerobic methanogenesis tank (6). The effluent of hydrolysis-acidification tank (1) flows to a middle tank (4) and then is fed in anaerobic methanogenesis tank (6) using a pump (5). The influent for hydrolysis-acidification tank (1) is also delivered by a pump (1). The reactor is featured as follows: 2~4 ZVI-filling layers (3) are set in the middle of the hydrolysis acidification tank (1) to accelerate acidification of organics and produce more acetate beneficial for the subsequent methanogenesis. After the enhanced hydrolysis acidification tank (1), the wastewater is transported into the methanogenic tank (6). Other features are: The bottom of the ZVI filling layers is set at the half of the height (H) of the anaerobic hydrolysis acidification tank (1). The height of each ZVI-filling layers is 10%-15% of H. Each ZVI layer (3) is filled with scrap iron with a size about (10-20 mm)×(5-10 mm)×(2-5 mm).

Advantageous Effects of the Invention

The addition of ZVI in hydrolysis acidification tank in the two-phase anaerobic reactor can effectively enhance the degradation ability of organics in the acidification, and provide the favorable substrate for subsequent methanogens. Its advantageous effects are as follows.

Firstly, the acidification of organics is accelerated by ZVI because ZVI can increase the enzyme activity related to hydrolysis-acidification by 2-48 times. Secondly, acetate production is promoted and propionate fermentation is reduced in hydrolysis-acidification tank, providing a favorable substrate form for consequent methanogenesis. Thirdly, the acidic environment in hydrolysis-acidification may promote the dissolution of ZVI to maintain its activity.

Due to the above reasons, the anaerobic methanogenesis may be well-operated even under high feeding load or low temperature. Compared with the reference reactor with no ZVI added, the performance of this coupling system is enhanced significantly.

SCHEMATIC DIAGRAM

FIG. 1 A structure diagram for the invention of a two-phase anaerobic reactor enhanced by ZVI.

Figure 2:
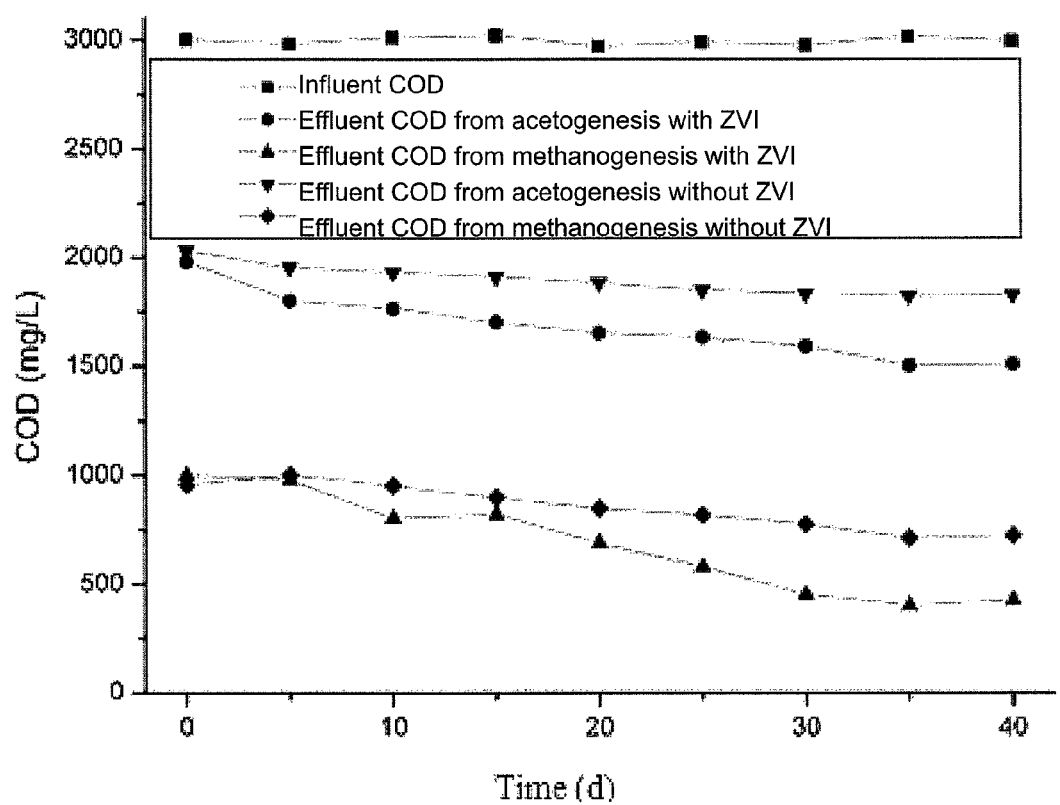

FIG. 2 Curves for influent and effluent COD of startup phase used synthetic glucose wastewater. X-axis is operating days, and y-axis is COD values. The five curves are COD in the influent, the effluent of hydrolysis-acidification enhanced by ZVI and the methanogenesis, the effluent at control hydrolysis acidification and the methanogenesis, respectively.

Figure 3:
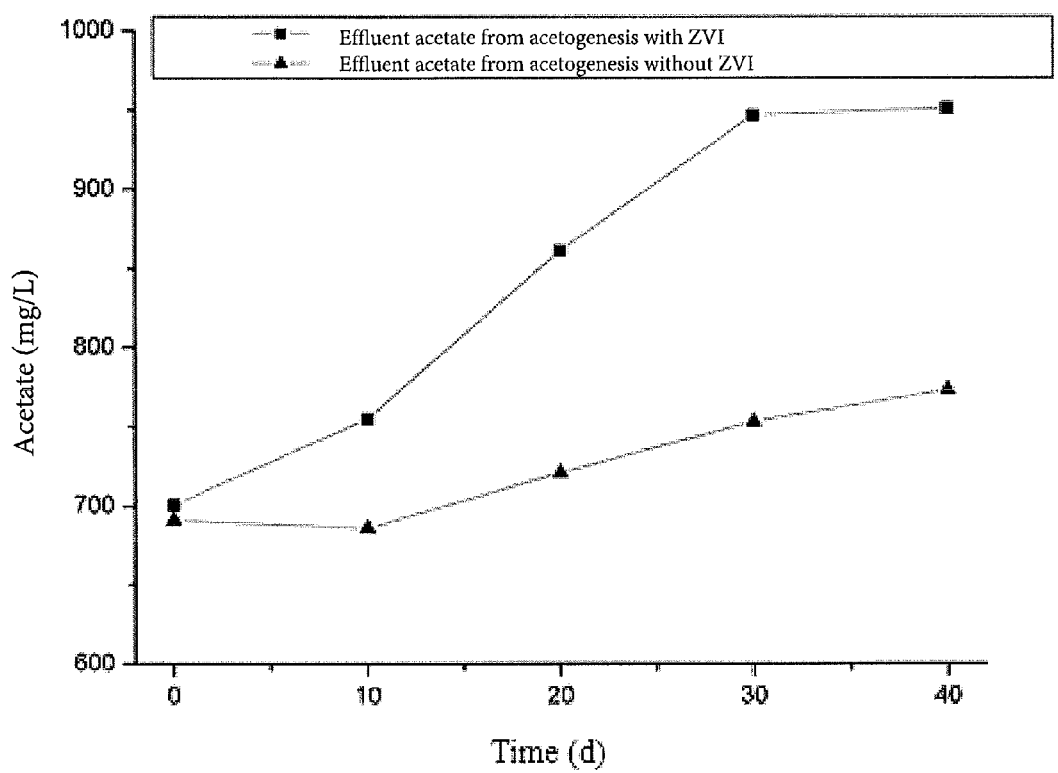

FIG. 3 Curves for the effluent acetate of startup phase used synthetic glucose wastewater. X-axis is operating days, and y-axis is acetate values. The two curves are acetate for the effluent at hydrolysis acidification enhanced by ZVI and the control one, respectively.

1. Anaerobic hydrolysis-acidification tank, 2. Inlet pump, 3. ZVI-filling layers, 4. middle tank, 5. Pump, 6. Anaerobic methanogenesis tank

MODE FOR INVENTION

FIG. 1 is a structure diagram for the invention of a two-phase anaerobic reactor enhanced by ZVI. The device mainly consists of a cylindrical anaerobic hydrolysis acidification reactor 1 whose shell is made of plexiglass with an inner diameter of 10 cm and a height of 25 cm. Its working volume is 1.8 L. After entering the anaerobic hydrolysis-acidification tank 1 by inlet pump 2, sewage flows through ZVI filling layers 3. Then the effluent flows into the middle tank 4, and then was pumped (5) into the anaerobic methanogenesis tank 6 with an inner diameter of 10 cm, a height of 100 cm. Its working volume of 7.5 L.

The working process of the coupling reactor is as follows: At first, sewage A goes into the bottom of the anaerobic hydrolysis acidification tank 1 through the inlet pump 2, fully contacting with organisms in the sludge during the sewage rise process, then passing ZVI filling layers 3 and entering middle tank 4, finally flowing into the anaerobic methanogenesis tank 6 through pump 5.

FIGS. 2 and 3 show the synthetic glucose wastewater treatment of the reactor aforesaid. It can be seen that COD removals at the hydrolysis acidification enhanced by ZVI and the following methanogenesis are significantly higher than that of the control one.

We claim:

1. A two-phase anaerobic reactor enhanced by zero-valent iron (ZVI) consists essentially of an anaerobic hydrolysis-acidification tank (1) equipped with ZVI-filling layer (3), and an anaerobic methanogenesis tank (6), wherein the effluent of hydrolysis-acidification tank (1) flows to a middle tank (4) and then is fed in anaerobic methanogenesis tank (6) using a pump (5), the influent for hydrolysis-acidification tank (1) is also delivered by a pump (1), and the reactor is featured as follows: 2~4 ZVI-filling layers (3) are set in the middle of the hydrolysis-acidification tank (1) to accelerate acidification of organics and produce more acetate beneficial for the subsequent methanogenesis and, after the enhanced hydrolysis acidification tank (1), the wastewater is transported into the methanogenic tank (6).

2. The two-phase anaerobic reactor enhanced by ZVI of claim 1, wherein the bottom of the ZVI-filling layers (3) is set at the half of the height (H) of the anaerobic hydrolysis-acidification tank (1), the height of each ZVI-filling layers is 10%~15% of H, and ⅔ of the space of each ZVI layer is equipped with iron granular materials.

* * * * *